(12) United States Patent
Tsai et al.

(10) Patent No.: US 10,864,586 B2
(45) Date of Patent: Dec. 15, 2020

(54) ELECTROCHEMICAL MACHINING DEVICE

(71) Applicant: INTAI TECHNOLOGY CORP., Taichung (TW)

(72) Inventors: Yung-Fang Tsai, Taichung (TW); Chia-Wei Cheng, Chiayi County (TW)

(73) Assignee: INTAI TECHNOLOGY CORP., Taichung (TW)

( * ) Notice: Subject to any disclaimer, the term of this patent is extended or adjusted under 35 U.S.C. 154(b) by 70 days.

(21) Appl. No.: 15/853,987

(22) Filed: Dec. 26, 2017

(65) Prior Publication Data
US 2019/0168325 A1 Jun. 6, 2019

(30) Foreign Application Priority Data
Dec. 1, 2017 (CN) .......................... 2017 1 1249900

(51) Int. Cl.
| | |
|---|---|
| *B23H 5/02* | (2006.01) |
| *B23H 3/02* | (2006.01) |
| *B23H 11/00* | (2006.01) |
| *B23H 3/06* | (2006.01) |
| *B23H 7/30* | (2006.01) |

(Continued)

(52) U.S. Cl.
CPC .................. *B23H 5/02* (2013.01); *B23H 3/02* (2013.01); *B23H 3/04* (2013.01); *B23H 3/06* (2013.01); *B23H 7/30* (2013.01); *B23H 11/003* (2013.01); *B23H 7/26* (2013.01)

(58) Field of Classification Search
USPC ....................................................... 205/672
See application file for complete search history.

(56) References Cited

U.S. PATENT DOCUMENTS

| | | | | |
|---|---|---|---|---|
| 3,196,093 A | * | 7/1965 | Williams ................. | B23H 3/00 |
| | | | | 205/665 |
| 3,399,125 A | * | 8/1968 | Mikoshiba ............... | B23H 3/10 |
| | | | | 204/224 M |

(Continued)

FOREIGN PATENT DOCUMENTS

| | | |
|---|---|---|
| CN | 101883655 A | 11/2010 |
| JP | 11170119 A * | 6/1999 |

(Continued)

OTHER PUBLICATIONS

Machine translation of JP 11170119 of Mori et al. (Year: 1999).*

*Primary Examiner* — Brian W Cohen
(74) *Attorney, Agent, or Firm* — CKC & Partners Co., LLC

(57) ABSTRACT

An electrochemical machining device includes a plurality of electrodes, a guiding member and a plate member. The electrodes are disposed around a workpiece. The guiding member is configured to limit and guide each of the electrodes to move. The plate member is configured to exert a force to each of the electrodes. The driving member is configured to rotate the workpiece. The plate member is connected to each of the electrodes. A force-exerting direction of the force from the plate member to each of the electrodes is parallel to a central axis of each of the electrodes or deflects off the central axis. Each of the electrodes is passed through the guiding member and configured to perform a machining on the workpiece which is rotated by the driving member, and each of the electrodes has an electrochemical machining direction which is perpendicular, oblique or parallel to the workpiece.

12 Claims, 19 Drawing Sheets

(51) Int. Cl.
　　　*B23H 3/04*　　　(2006.01)
　　　*B23H 7/26*　　　(2006.01)

(56) References Cited

U.S. PATENT DOCUMENTS

| | | | | |
|---|---|---|---|---|
| 5,507,925 A | * | 4/1996 | Brew | B23H 9/00 |
| | | | | 205/660 |
| 5,820,744 A | * | 10/1998 | Edwards | B23H 3/02 |
| | | | | 205/640 |
| 2003/0024825 A1 | * | 2/2003 | Lamphere | B23H 1/00 |
| | | | | 205/640 |
| 2008/0135418 A1 | * | 6/2008 | Yuan | B23H 1/10 |
| | | | | 205/686 |
| 2013/0193000 A1 | * | 8/2013 | Platz | B23H 9/02 |
| | | | | 205/653 |

FOREIGN PATENT DOCUMENTS

| | | |
|---|---|---|
| TW | 521016 B | 2/2003 |
| TW | M517037 U | 2/2016 |

* cited by examiner

ELECTROCHEMICAL MACHINING DEVICE

RELATED APPLICATIONS

This application claims priority to China application No. 201711249900.X, filed on Dec. 1, 2017, which is herein incorporated by reference.

BACKGROUND

Technical Field

The present disclosure relates to an electrochemical machining device. More particularly, the present disclosure relates to an electrochemical machining device being capable of performing multi-dimensional machining.

Description of Related Art

Recently, the demands for high precision on large area machining technology has Increased rapidly. For example, the electronic industry, the optical engineering, the biotechnology, the aeronautic industry and the automotive industry are all equipped with high precision components.

Conventional mechanical machining tools such as lathe or milling machine are used to remove unnecessary parts of an object to form desired shapes by physical methods. However, the limitations on the operation mechanism and the structure make it difficult to produce sharp edges and complicated curvatures. Furthermore, the high temperature induced from the friction may damage the object. Moreover, it is also impossible to produce shapes in micron or nano scale, thus it cannot satisfy the needs of high precision industry.

Electrochemical Machining (ECM) is a technology that can perform the high precision and a large machining area. FIG. 1 is a schematic view showing a conventional electrochemical machining process. In FIG. 1, the electrode 102 is brought to move toward a workpiece 101 without contacting with the workpiece 101. At this time, the electrode 102 acts as a cathode, and the workpiece 101 acts as an anode. Electrolyte 103 is filled between the workpiece 101 and the electrode 102. When a current is applied to the electrode 102, the current flows from the electrode 102 to the workpiece through the electrolyte 103. Owing to the electrochemical effect, a chemical reaction occurs on the workpiece 101, and the electron and the ion are released from the workpiece 101, thus the material of the workpiece 101 is gradually removed. The electrode 102 can be moved along a predetermined path, and the electrochemical effect continuously occurs on the surface of the workpiece 101 to continuously remove the material of the workpiece 101. As a result, a desired shape can be formed on the workpiece 101.

The advantages of the aforementioned electrochemical machining are: (a) suitable for hard material because it can be performed to the materials with any hardness as long as the workpiece 101 is an electrically conductive material; (b) since the electrode 102 does not contact with the workpiece 101, the electrode 102 can be made of any material that is easy to be machined; (c) low heat is produced during the whole machining process, thus no residual stress will be left on the surface of the workpiece 101, and the characteristic of the workpiece 101 will not be influenced; and (d) suitable for processing the workpiece 101 having complicated shape and surface profile.

Despite of the aforementioned advantages of the electrochemical machining, the quality of the workpiece 101 may still be deteriorated if the electrode 102 cannot be stabilized during the machining process executed in environments with high pressure. For example, in the aero engine or the automotive industry complex shapes are required that have multiple orientations. These features are complex to produce by conventional means and cannot be produced simultaneously because of their differing orientations.

Therefore, there is a requirement to be able to produce several features simultaneously in the same workpiece. ECM can do this with the appropriate tooling.

SUMMARY

According to one aspect of the present disclosure, an electrochemical machining device is capable of performing multi-dimensional machining. The electrochemical machining device includes a plurality of electrodes, a guiding member and a plate member. The electrodes are disposed around a workpiece. The guiding member is configured to limit and guide each of the electrodes to move. The plate member is configured to exert a force to each of the electrodes. The driving member is configured to rotate the workpiece. The plate member is connected to each of the electrodes. A force-exerting direction of the force from the plate member to each of the electrodes is parallel to a central axis of each of the electrodes or deflects off the central axis. Each of the electrodes is passed through the guiding member and configured to perform a machining on the workpiece which is rotated by the driving member, and each of the electrodes has an electrochemical machining direction which is perpendicular, oblique or parallel to the workpiece.

According to another aspect of the present disclosure, an electrochemical machining device is capable of performing multi-dimensional machining. The electrochemical machining device includes a plurality of electrodes, a guiding member, a plate member, a driving member and a power supply system. The electrodes are disposed around a workpiece. The guiding member is configured to limit and guide each of the electrodes to move. The plate member is configured to exert a force to each of the electrodes. The driving member is configured to rotate the workpiece. The plate member is connected to each of the electrodes. A force-exerting direction of the force from the plate member to each of the electrodes is parallel to a central axis of each of the electrodes or deflects off the central axis. The power supply system provides a negative charge to each of the electrodes and a positive charge to the workpiece along a power supply path. Each of the electrodes is passed through the guiding member and configured to perform a machining on the workpiece which is rotated by the driving member, and each of the electrodes has an electrochemical machining direction which is perpendicular, oblique or parallel to the workpiece.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
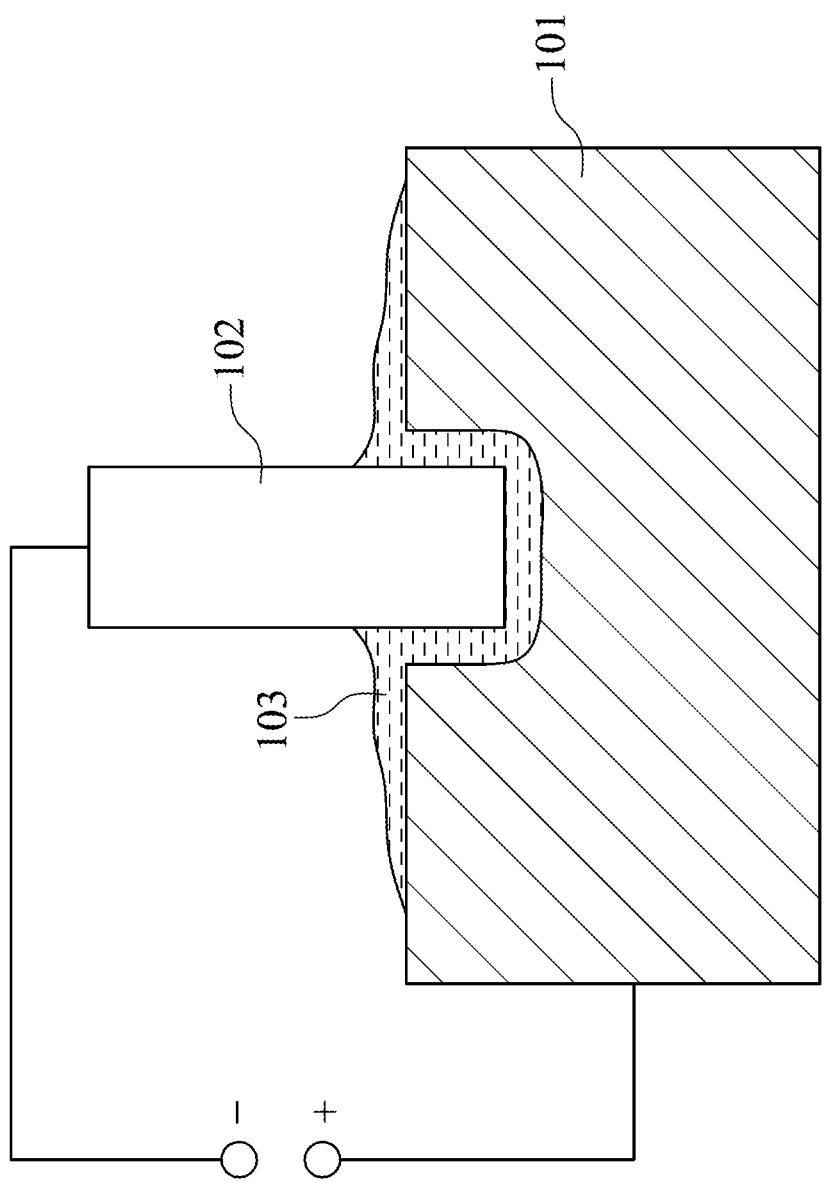
FIG. 1 is a schematic view showing a conventional electrochemical machining process.

Reference will now be made in detail to the present embodiments of the disclosure, examples of which are illustrated in the accompanying drawings. Wherever possible, the same reference numbers are used in the drawings and the description to refer to the same or like parts.

The present disclosure provides an electrochemical machining device being capable of performing multiple features with differing orientations and guidance of the electrodes to facilitate the various orientations. The motion of the electrodes is performed by a plate member 201, 520 (normally linear but can be rotated). FIGS. 2-9 show the electrochemical machining device being capable of performing multiple features and multiple angles machining. FIGS. 10-19 show the electrochemical machining device being capable of performing multi-dimensional machining.

Figure 2:
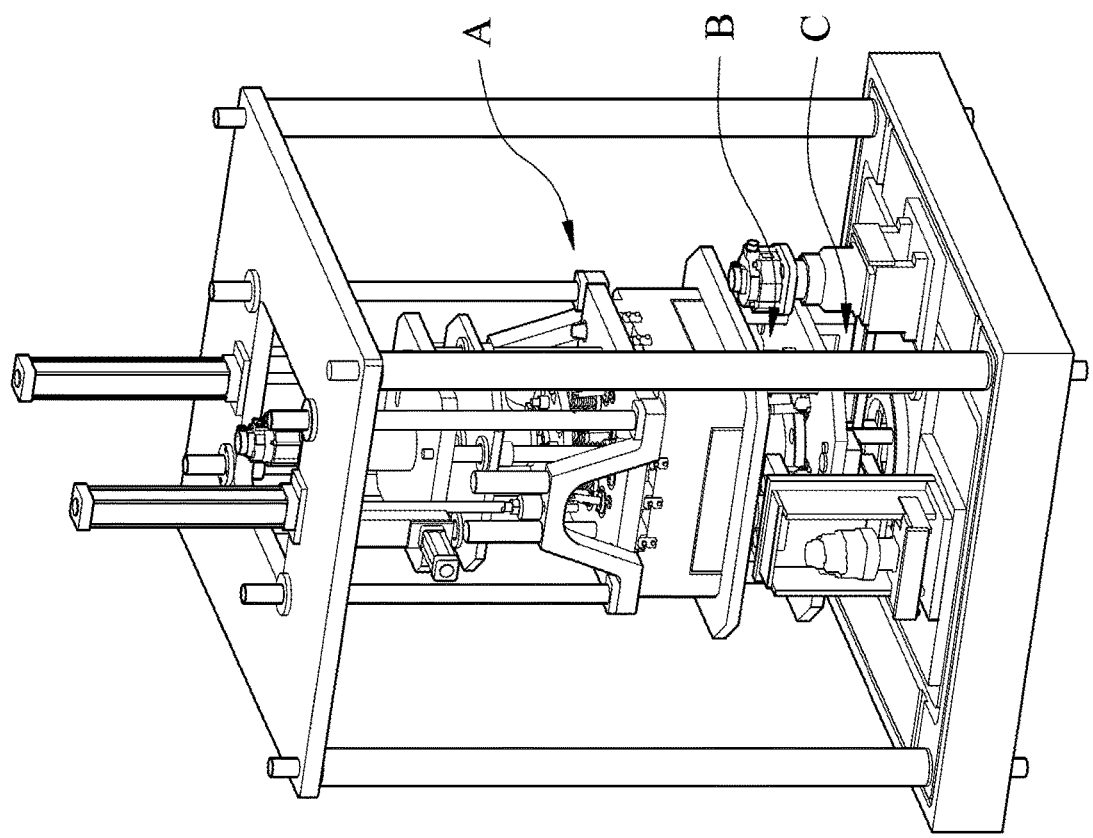
FIG. 2 is a schematic view showing an electrochemical machining device which is capable of performing multi-dimensional machining according to one embodiment of the present disclosure.
Figure 3:
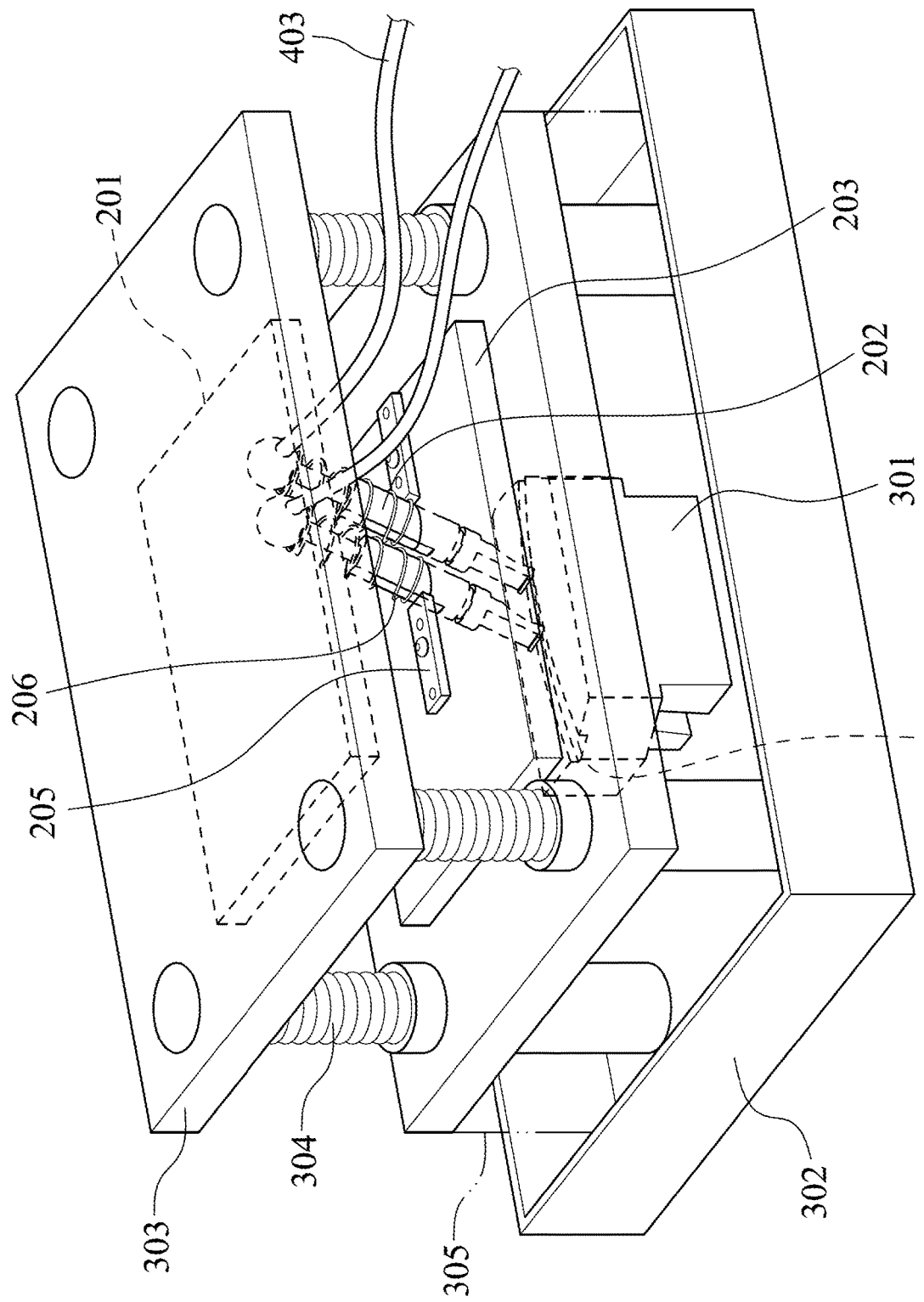
FIG. 3 is a schematic view showing a part of the electrochemical machining device of FIG. 2.
Figure 4:
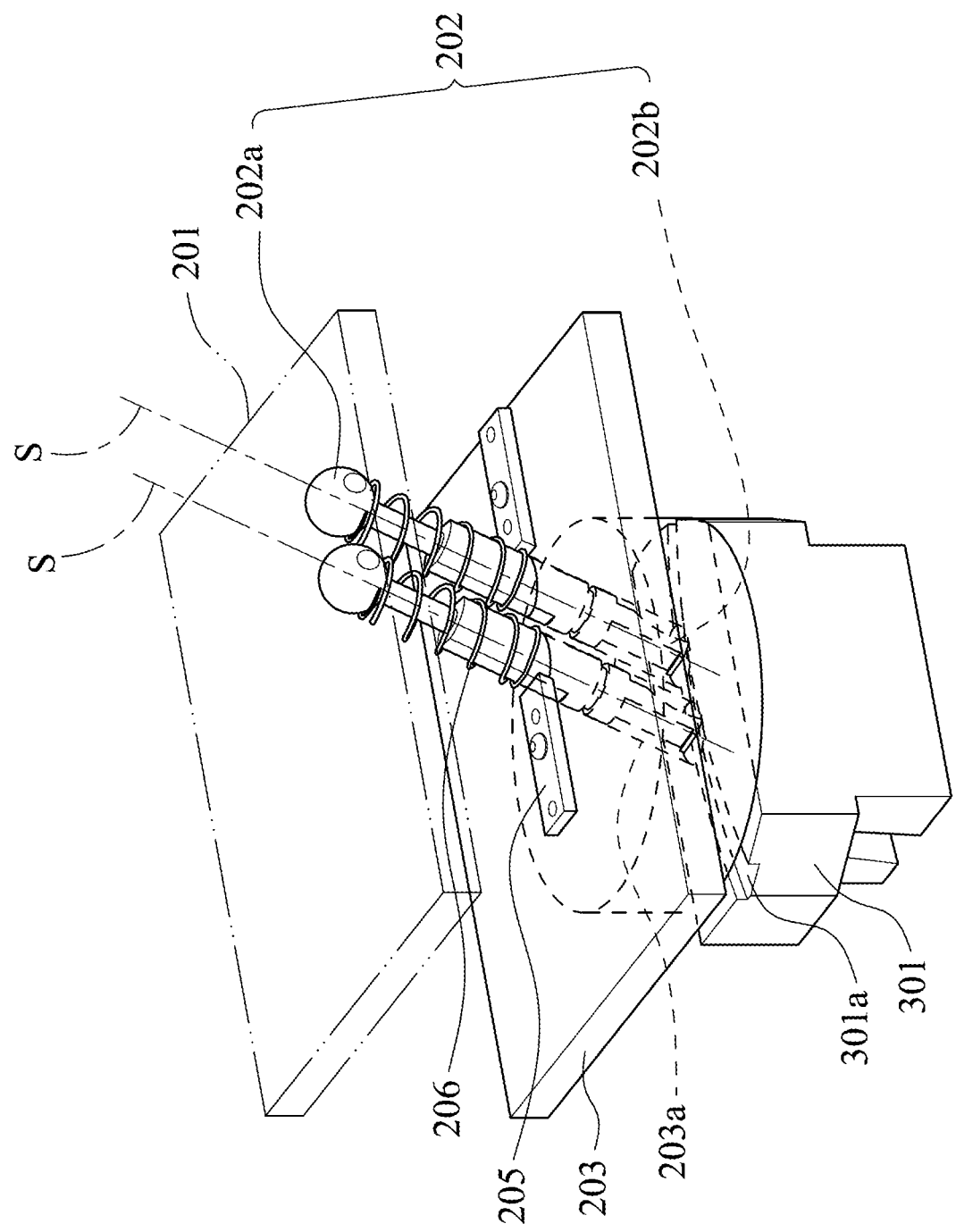
FIG. 4 is a schematic view showing a part of the electrochemical machining device of FIG. 3.
Figure 5:
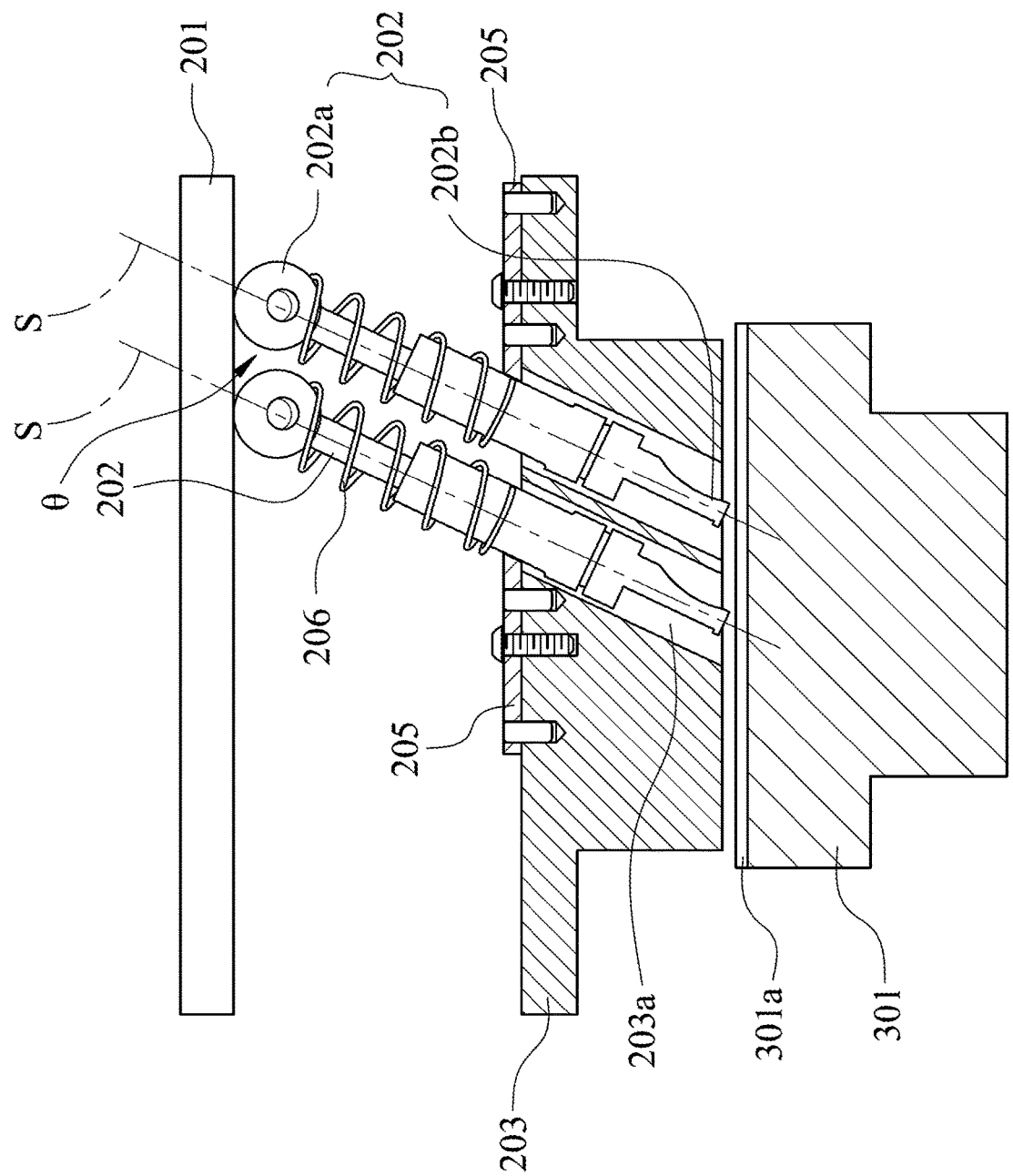
FIG. 5 is a sectional view of the electrochemical machining device of FIG. 4.

FIG. 2 is a schematic view showing the electrochemical machining device which is capable of performing multi-dimensional machining according to one embodiment of the present disclosure; FIG. 3 is a schematic view showing a part of the electrochemical machining device of FIG. 2; FIG. 4 is a schematic view showing a part of the electrochemical machining device of FIG. 3; and FIG. 5 is a sectional view of the electrochemical machining device of FIG. 4.

In FIG. 2, the electrochemical machining device includes three regions A, B and C. A structure of performing multi-dimensional machining of the electrochemical machining device is located in the region A.

The structure of performing multi-dimensional machining includes a plate member 201, two electrodes 202, a guiding member 203 and a pressurized tank 305. In one example, the plate member 201 is a plane plate for providing uniform force. The plate member 201, the two electrodes 202, the guiding member 203 and the pressurized tank 305 are disposed on a carrying platform 302. The number of the electrodes 202 is not limited to two but it may be three or more.

Each of the two electrodes 202 is rigid and has a free end 202a and a conductive end 202b. The two electrodes 202 are spaced apart, and there is an angle θ located between the two electrodes 202. In one embodiment, the angle θ is 0 degrees, so that the two electrodes 202 are parallel to each other. The angle θ can be freely changed for achieving more complicated machining.

Two guiding apertures 203a are formed on the guiding member 203. The two electrodes 202 are inserted through the two guiding apertures 203a, respectively. Each of the two guiding apertures 203a provides sufficient moving spaces to limit and guide the two electrodes 202. Furthermore, the two electrodes 202 can also have multiple angle variations in the two guiding apertures 203a.

The pressurized tank 305 accommodates the guiding member 203. The pressurized tank 305 is configured to provide a flow pressure to an electrolyte which flows inside the pressurized tank 305 and is located between the two electrodes 202 and a workpiece 301.

The guiding member 203 includes two fixing members 205, and the fixing member 205 is configured to limit a position of each of the electrodes 202. In order to prevent the electrodes 202 rotating, the two fixing members 205 are disposed in two sides of each of the electrodes 202, respectively. In one example, the two fixing members 205 abut two sidewalls of the two electrodes 202, thus self-rotation of the two electrodes 202 is avoided.

Moreover, for achieving the functionality of repeat machining, each of the electrodes 202 has a spring member 206 disposed therethrough, and the spring member 206 is configured to provide an elastic recovering force to each of the electrodes 202. Each of the spring members 206 is disposed between the free end 202a and the guiding aperture 203a of each of the electrodes 202, thus each of the two electrodes 202 can move back to its initial position.

First the workpiece 301 is put into the pressurized tank 305. The pressurized tank 305 is then filled with the electrolyte. The pressurized tank 305 is sealed and there is no route for the electrolyte to flow out of the pressurized tank 305 other than through slots that are machined in the electrodes 202. The electrodes 202 have a core running through them from the machining face slots up to an outlet pipe 403 at the free end 202a of the electrode 202. The electrolyte flows into the pressurized tank 305 with a pressure P1, through the slots in the electrode 202, and then out through the outlet pipe 403. A back pressure P2 is applied at the end of the outlet pipe 403. This is called a reverse flow. The structure of the reverse flow of the present disclosure guarantees that the flow is uniform over the machining face so as to solve the problem of an uneven flow of the electrolyte through the surface of the workpiece and greatly improve machining accuracy.

The machining process is then ready to commence. The plate member 201 pressed by a pressing plate 303 comes down and contacts the free end 202a of the electrodes 202. Then, the electrodes 202 guided by the guiding member 203 is moved towards the workpiece 301, and there is a gap between each of the electrodes 202 and the workpiece 301. Four guiding posts 304 are disposed on four corners of the pressing plate 303, respectively. The four guiding posts 304 are located between the pressing plate 303 and the pressurized tank 305. The power is then applied to the two electrodes 202 and electrochemical machining commences. The metal is removed from the workpiece 301 and flows in the electrolyte as a metal hydroxide up the electrode 202 and out to a return tank. The speed of machining is controlled by a computer numerical control (CNC) machine.

The free ends 202a of the two electrodes 202 can be freely moved and are not contacted with the plate member 201 initially. When the plate member 201 is forced by the pressing plate 303, it will move gradually close to the free ends 202a and then contact with the free ends 202a. In one example, a surface of the free end 202a has an arc shape. Therefore, when the plate member 201 is connected to the free end 202a, the plate member 201 contacts a point in the surface of the free end 202a and exerts a force to the free end 202a. Owing to the arc-like surface of the free end 202a, different force-exerting directions may occur. For example, the force-exerting direction from the plate member 201 to the free end 202a may be parallel to a central axis S of the electrode 202 or deflects off the central axis S of the electrode 202. Therefore, when the plate member 201 vertically exerts the force to the electrodes 202, each of the electrodes 202 can form angle variations. In detail, the electrode 202 itself is rigid and unbendable. When the free end 202a of the electrode 202 is exerted with the force, the conductive end 202b of the electrode 202 will be linked-up with the free end 202a. The conductive end 202b of the electrode 202 is passed through the guiding aperture 203a of the guiding member 203. The guiding member 203 can be disposed on the carrying platform 302. The two electrodes 202 can be guided to respectively move along two predetermined paths of the guiding member 203. Accordingly, the electrochemical reaction can be continuously formed on the surface of the workpiece 301, and a final desired shape 301a may be formed on the workpiece 301. Moving paths of the two electrodes 202 can be the same or different for achieving complicated machining. In other words, the two predetermined paths of the guiding member 203 can be the same or different.

In one embodiment, when the electrochemical machining device utilizes only one electrode 202 during machining, multiple angles machining can be performed to form a complicated surface. In another embodiment, when the electrochemical machining device utilizes plural electrodes 202 during machining, multi-dimensional machining can be performed to form a more complicated surface.

Figure 6:
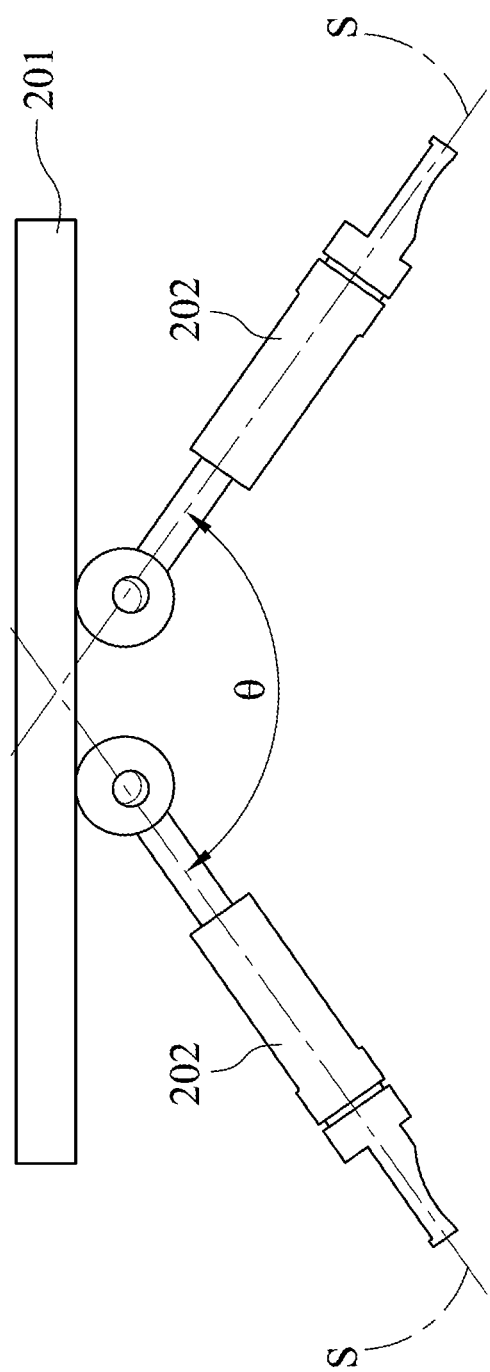
FIG. 6 is a schematic view showing one example of an alignment of two electrodes.
Figure 7:
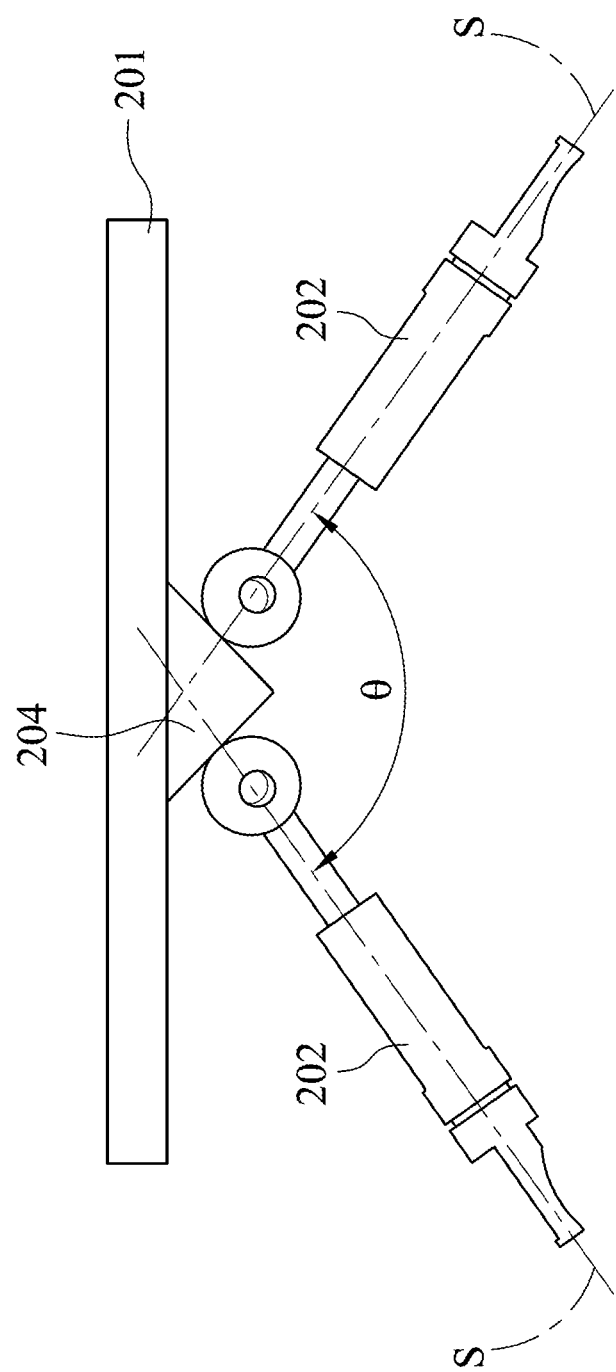
FIG. 7 is a schematic view showing another example of an alignment of the two electrodes stabled by a convex block.

FIG. 6 is a schematic view showing one example of an alignment of two electrodes 202; and FIG. 7 is a schematic view showing another example of an alignment of the two electrodes 202 stabled by a convex block 204.

The two electrodes 202 have a distance therebetween, and an angle θ is formed between the two electrodes 202. The angle θ is ranged from 0 degrees to 180 degrees. In FIGS. 2-5, the angle θ is 0 degree, thus the two electrodes 202 are aligned in parallel. In FIGS. 6 and 7, the angle θ is greater than 90 degrees and smaller than 180 degrees. Hence, the electrodes 202 of the present disclosure can perform a high complicated surface machining to a workpiece through the angle θ in combined with the angle variations of each of the electrodes 202. In FIG. 7, the convex block 204 can be disposed on the plate member 201 and is configured to average the force of the plate member 201 applied on each of the electrodes 202.

Furthermore, when the two electrodes 202 are aligned in parallel, the force-exerting direction from the plate member 201 to the free end 202a may be parallel to the central axis S of each of the electrodes 202 or deflects off the central axis S of each of the electrodes 202. Therefore, the conductive end 202b of each of the electrodes 202 can have complicated angle variations. When the two electrodes 202 are not aligned in parallel, more complicated angle variations of the conductive end 202b can be possibly obtained. Thus, when utilizing the two electrodes 202 to perform electrochemical machining simultaneously, multiple points and multiple angles machining can be performed to the surface of the workpiece 301, thus very complicated surface machining can be achieved, and machining efficiency can be improved. The plate member 201 can also be a linking apparatus. For example, the free end 202a of each of the electrodes 202 can be connected to a linear guideway.

Certainly, the number of the electrodes 202 can be greater than 2 to perform more complex and efficient electrochemical machining.

Figure 8:
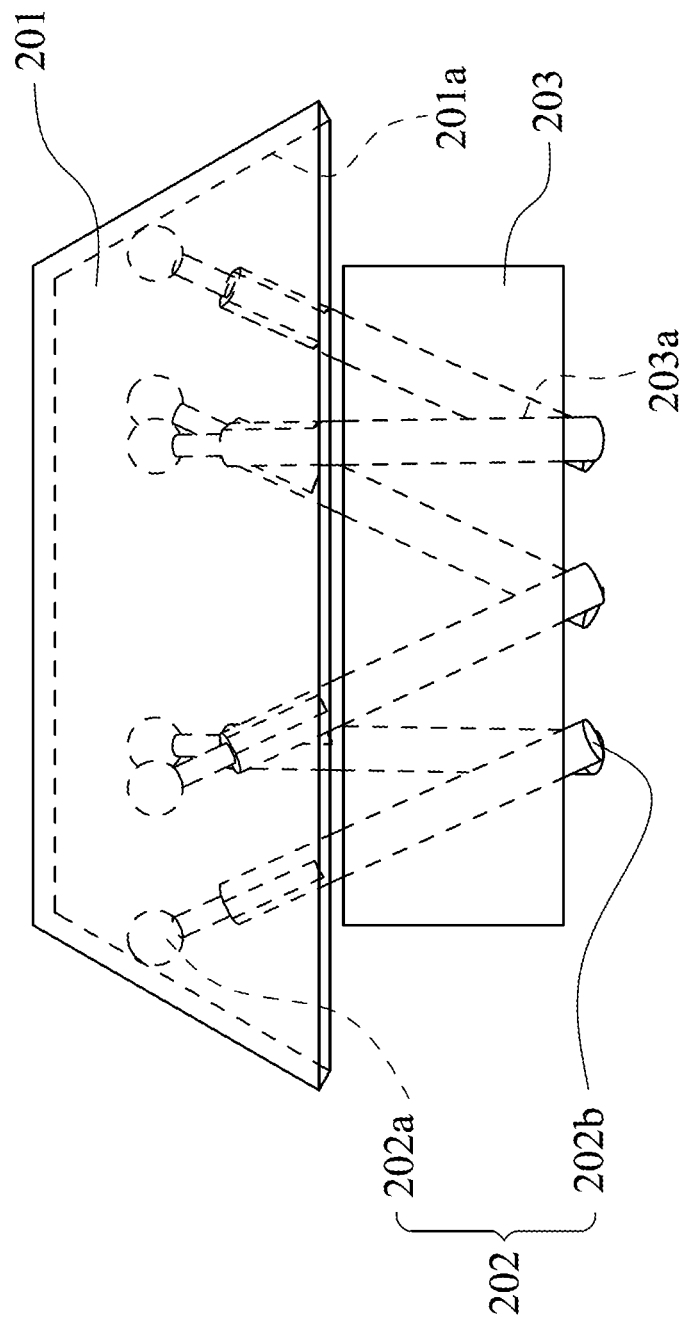
FIG. 8 is a schematic view showing one structure of an electrochemical machining device that is capable of performing multiple features and multiple angles machining.
Figure 9:
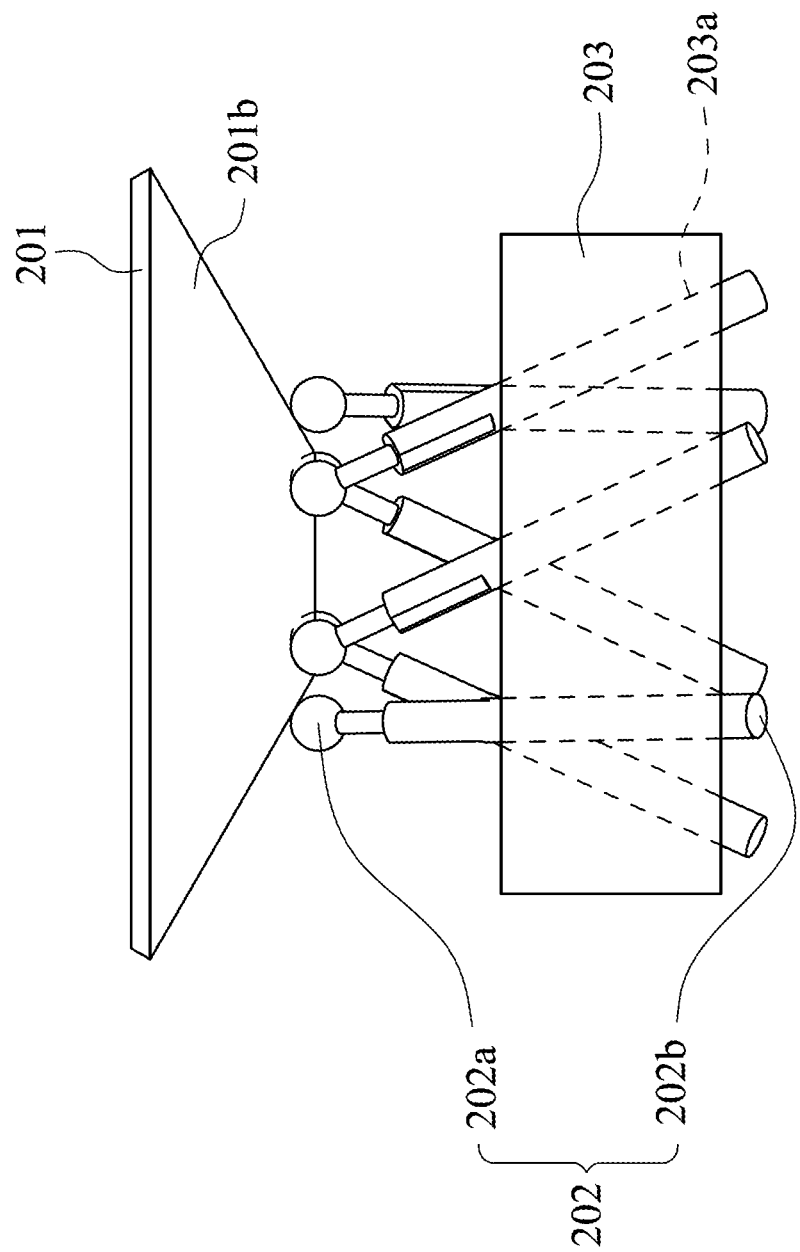
FIG. 9 is a schematic view showing another structure of an electrochemical machining device that is capable of performing multiple features and multiple angles machining.

FIG. 8 is a schematic view showing one structure of an electrochemical machining device that is capable of performing multiple features and multiple angles machining; and FIG. 9 is a schematic view showing another structure of an electrochemical machining device that is capable of performing multiple features and multiple angles machining.

In FIG. 8, a plurality of guiding apertures 203a are formed in the guiding member 203, and a plurality of electrodes 202 are disposed through the guiding apertures 203a, respectively. The electrodes 202 can be moved in the guiding apertures 203a, and the moving paths with different angles can be formed by the guiding apertures 203a. Therefore, the conductive ends 202b of the electrodes 202 are guided by the guiding apertures 203a to form different angle variations. The plate member 201 includes a surrounding sidewall, and an inner surface 201a of the sidewall can contact with the free ends 202a of the electrodes 202 when the plate member 201 is moved downward. Therefore, when the plate member 201 moves downward along a single axis, the plate member 201 can exert a pressure to the free ends 202a of the electrodes 202, and the conductive ends 202b can be moved to perform machining to the workpiece 301. The conductive ends 202b can have various angles respectively and can perform machining simultaneously, thus multiple points and multiple angles machining can be performed to form the complicated surface, and the machining efficiency can be improved.

In FIG. 9, the structure of the plate member 201 is different from that in FIG. 8. In FIG. 9, the plate member 201 contacts with the free ends 202a of the electrodes 202 by an outer surface 201b of the sidewall, therefore, different machining angles can be formed to increase the application range of the electrochemical machining. Accordingly, each of the electrodes 202 has an electrochemical machining direction which is perpendicular, oblique or parallel to the workpiece 301 according to the actual requirements.

Figure 10:
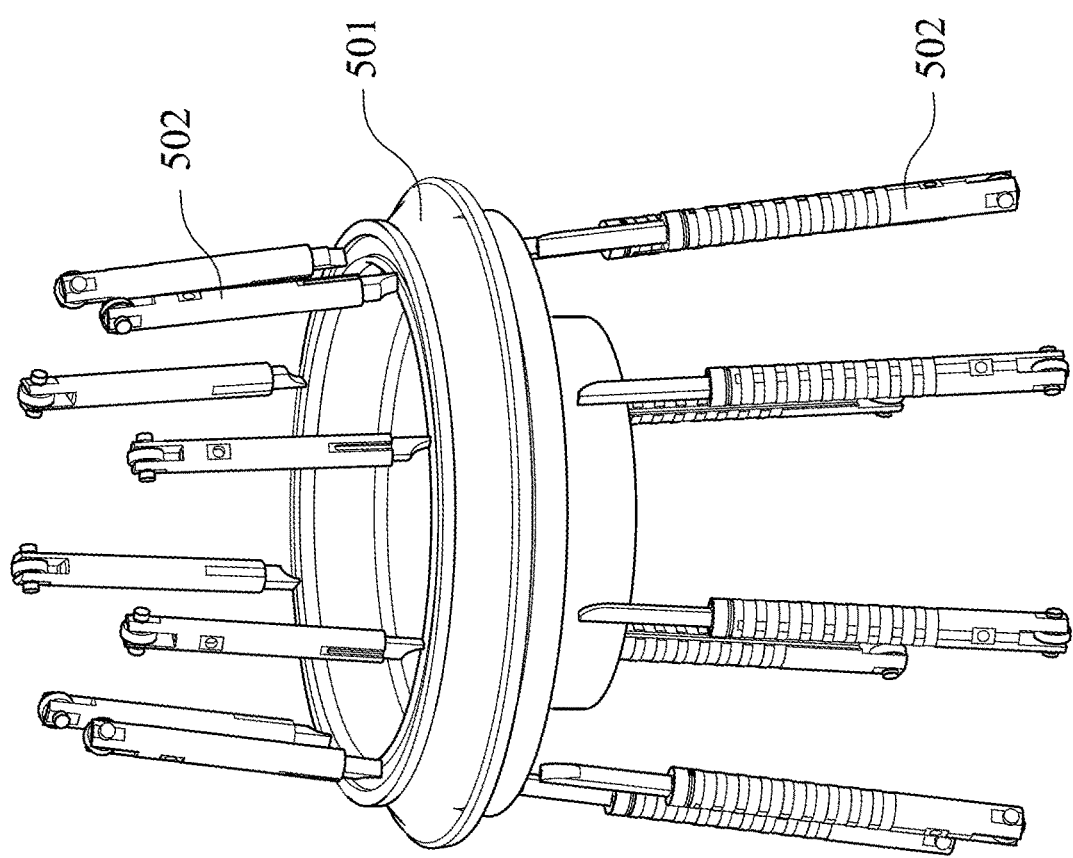
FIG. 10 is a schematic view showing the electrodes and a workpiece of the electrochemical machining device of FIG. 2.
Figure 11:
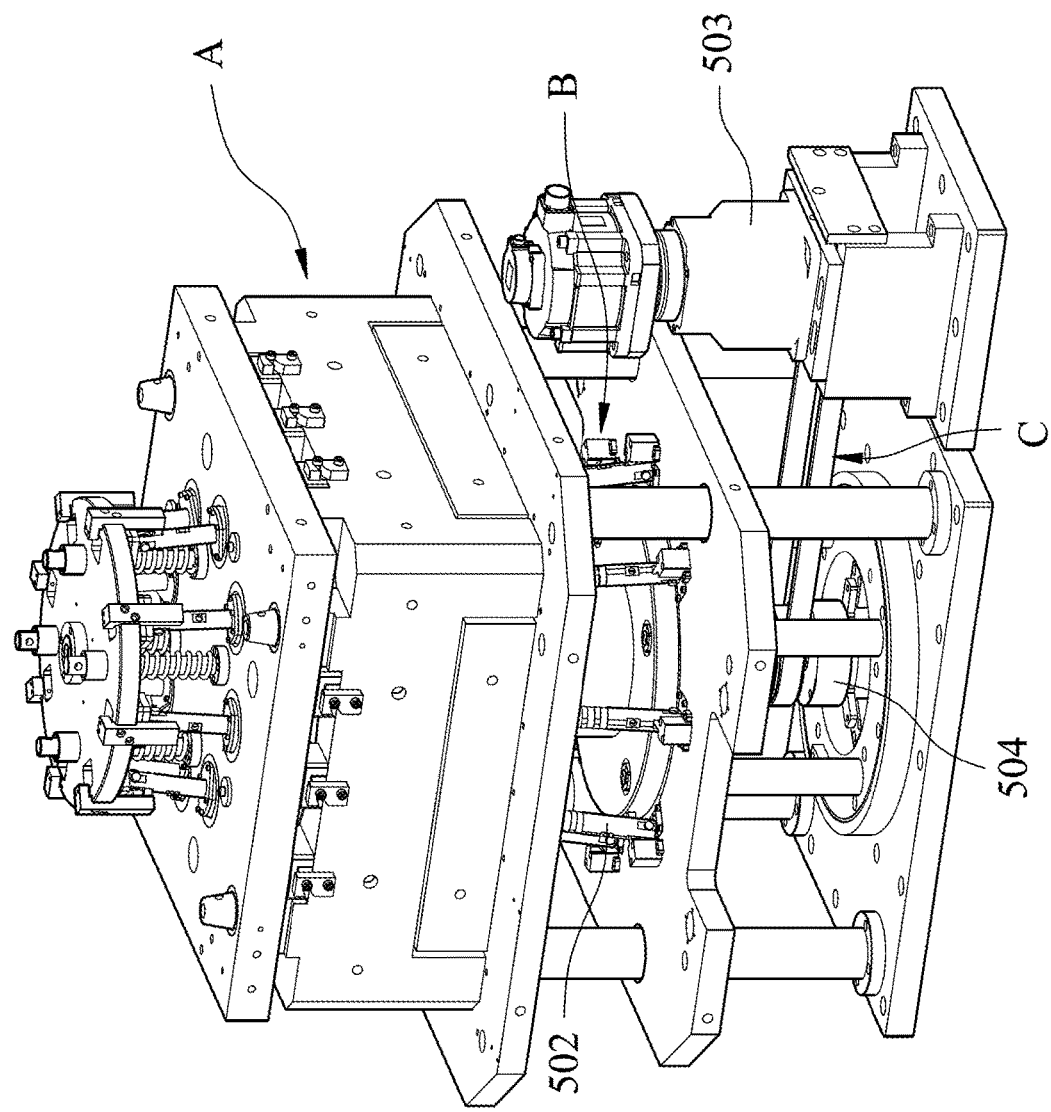
FIG. 11 is a schematic view showing a part of the electrochemical machining device of FIG. 2.
Figure 12:
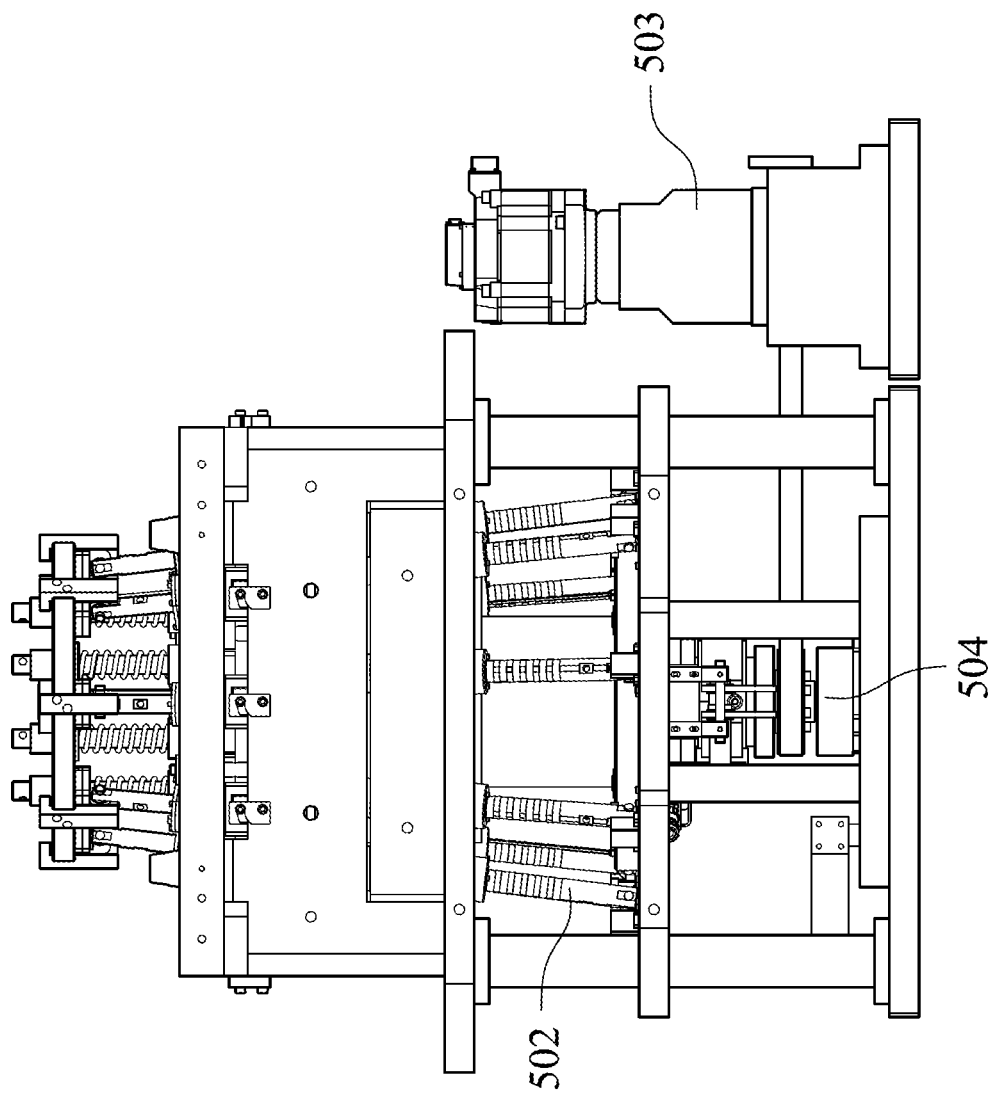
FIG. 12 is a schematic side view showing the part of the electrochemical machining device of FIG. 11.
Figure 13:
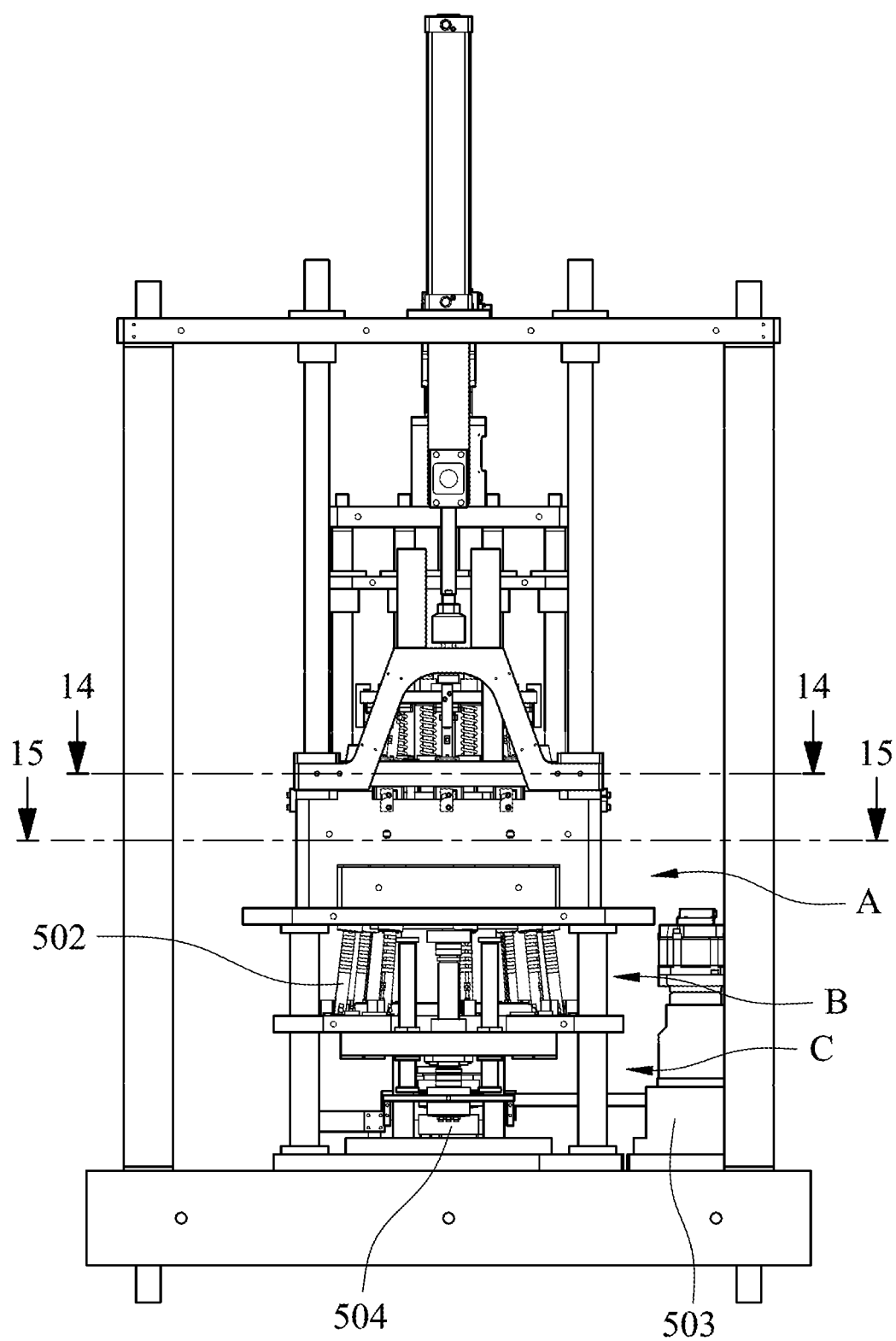
FIG. 13 is a schematic side view showing the electrochemical machining device of FIG. 2.
Figure 14:
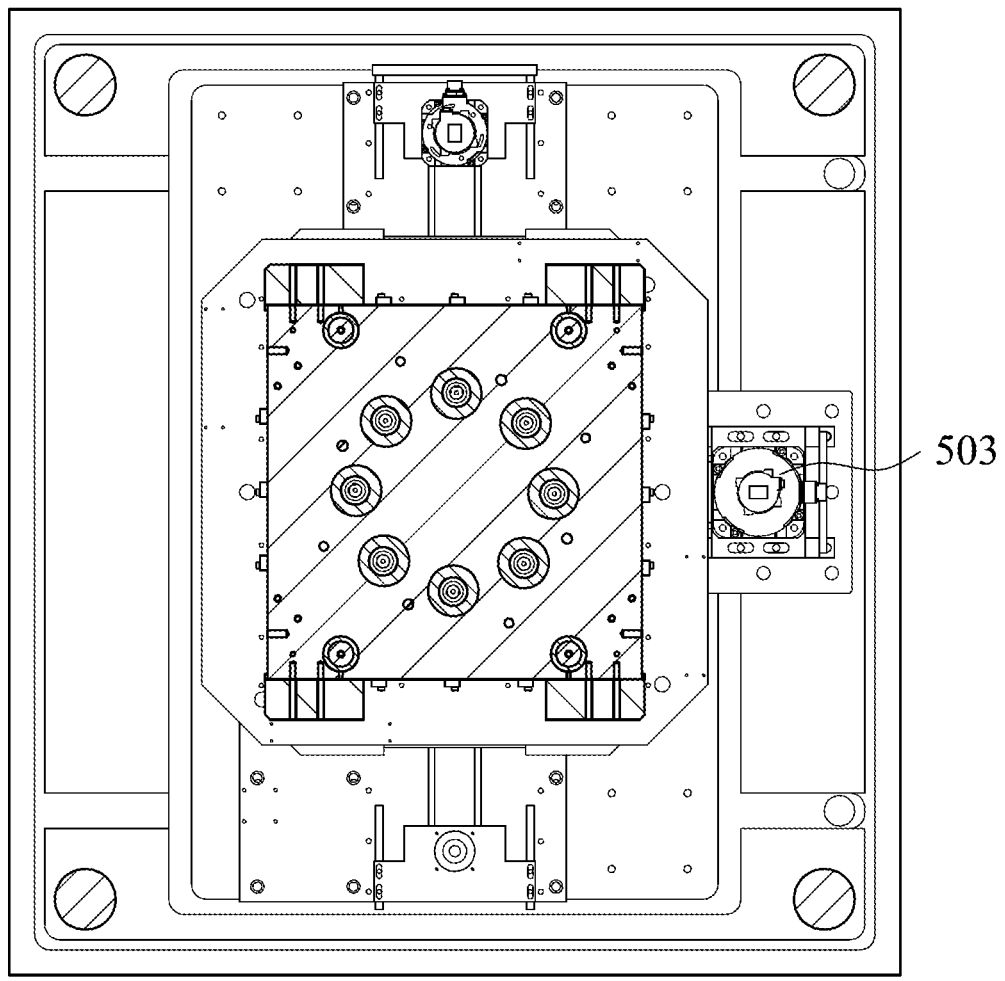
FIG. 14 is one cross-sectional view of the electrochemical machining device of FIG. 13.
Figure 15:
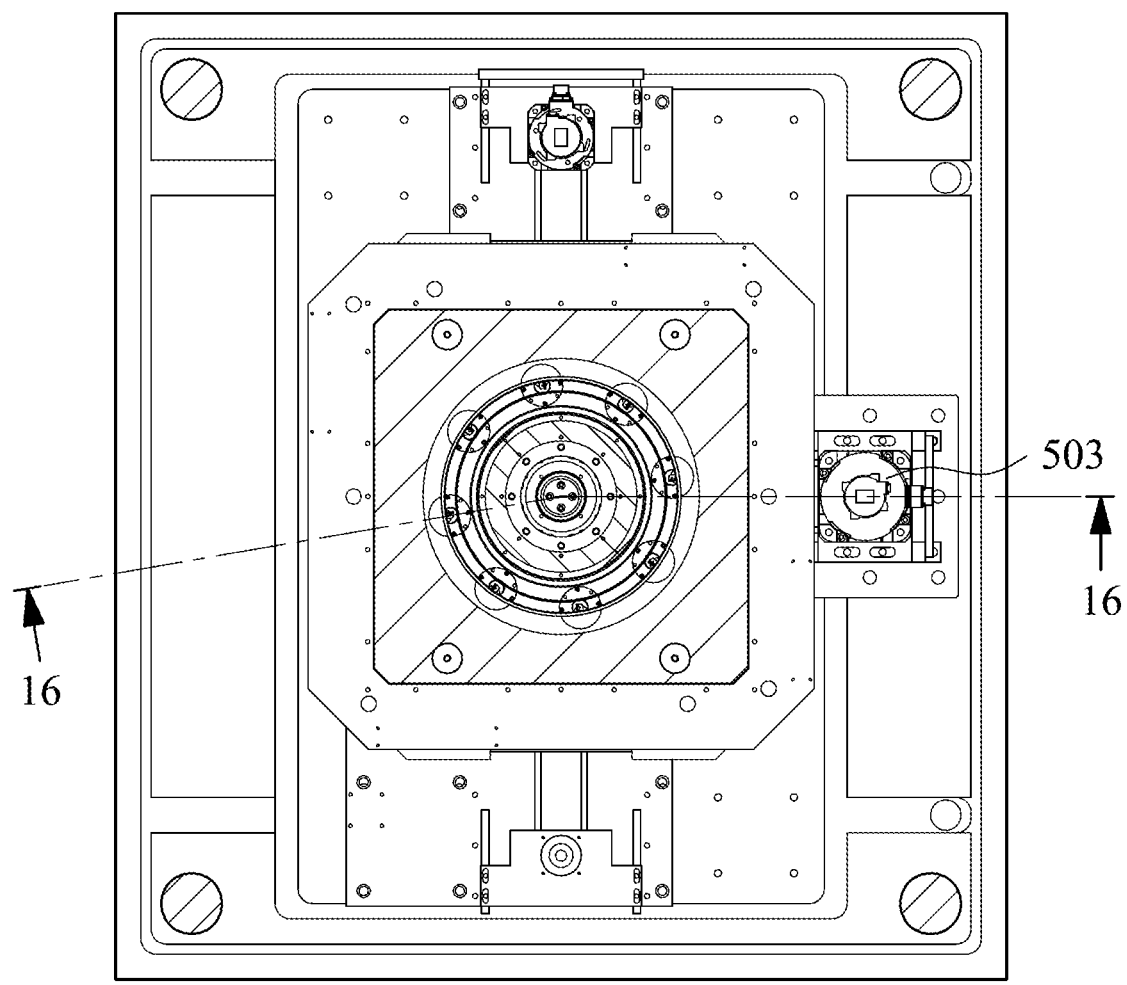
FIG. 15 is another cross-sectional view of the electrochemical machining device of FIG. 13.
Figure 16:
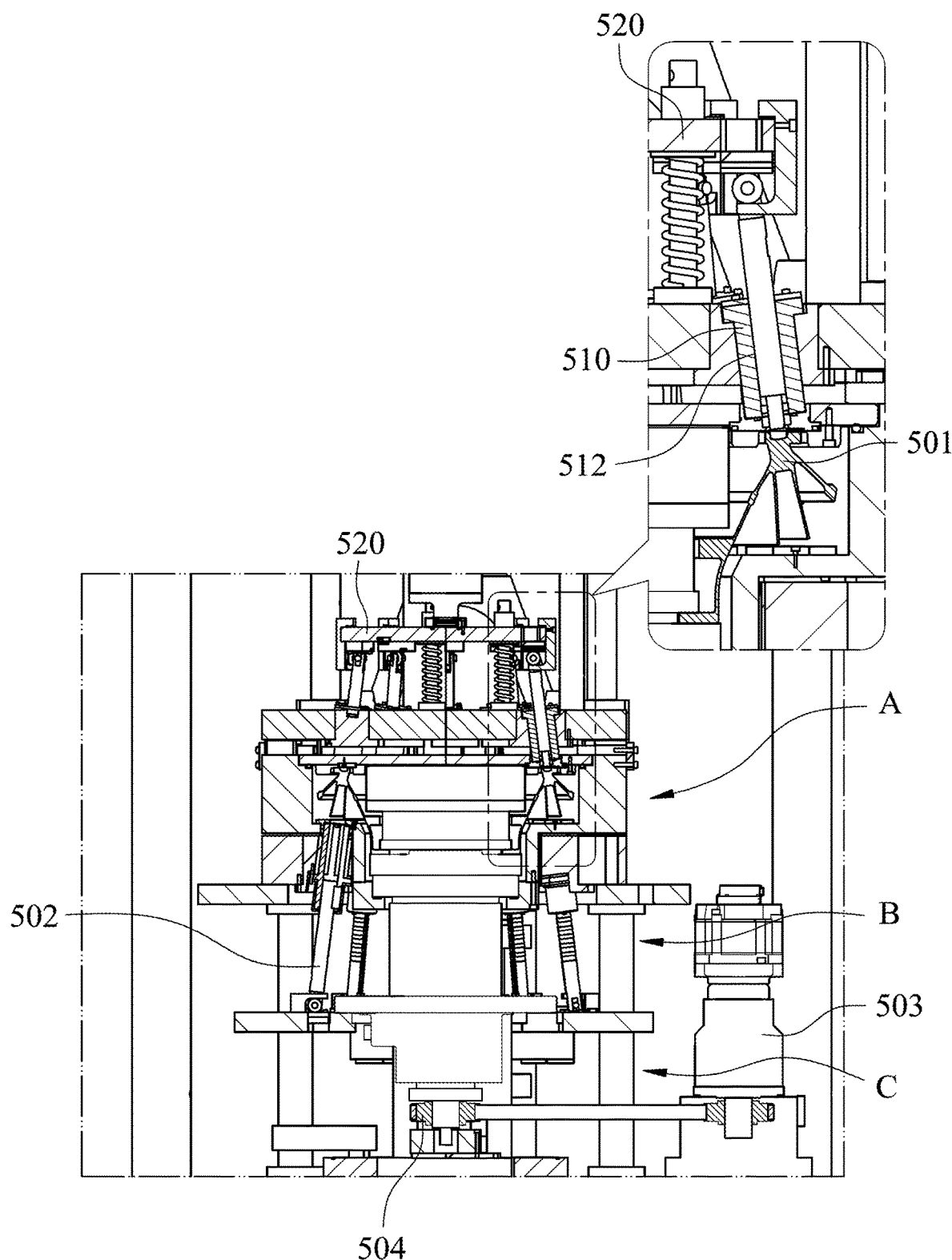
FIG. 16 is a cross-sectional view of the electrochemical machining device of FIG. 15.

FIG. 10 is a schematic view showing the electrodes 502 and a workpiece 501 of the electrochemical machining device of FIG. 2; FIG. 11 is a schematic view showing a part of the electrochemical machining device of FIG. 2; FIG. 12 is a schematic side view showing the part of the electrochemical machining device of FIG. 11; FIG. 13 is a schematic side view showing the electrochemical machining device of FIG. 2; FIG. 14 is one cross-sectional view of the electrochemical machining device of FIG. 13; FIG. 15 is another cross-sectional view of the electrochemical machining device of FIG. 13; and FIG. 16 is a cross-sectional view of the electrochemical machining device of FIG. 15.

In FIGS. 2-5, the electrodes 202 are disposed on the same side of the workpiece 301 (e.g., an upper side of the workpiece 301) to perform multiple points and multiple angles machining. However, a structure of a real product of the workpiece 501 is much more complicated and needs to form a plurality of complicated surfaces on the sides of the workpiece 501, as shown in FIG. 10. In order to perform the complicated surfaces, the present disclosure provides an electrochemical machining device which is capable of performing multi-dimensional machining operations on different surfaces of the workpiece 501, as shown in FIGS. 10-16. In FIGS. 10-16, the electrochemical machining device includes the electrodes 502 disposed around the workpiece 501, so that the surfaces of the workpiece 501 can be performed electrochemical machining simultaneously. For example, in FIGS. 10 and 11, the workpiece 501 and the electrodes 502 are arranged in the regions A and B. The electrodes 502 are separated into an upper side electrode group and a lower side electrode group. The upper side electrode group and the lower side electrode group are respectively disposed on two sides of the workpiece 501 so as to simultaneously perform electrochemical machining operations on surfaces of the two sides of the workpiece 501. In addition, the electrochemical machining device further includes a guiding member 510 and a plate member 520 which are connected to the electrodes 502 of the upper side electrode group. The guiding member 510 is configured to limit and guide each of the electrodes 502 to move. The guiding member 510 has a plurality of guiding apertures 512, and the electrodes 502 are inserted through the guiding apertures 512, respectively. The plate member 520 is configured to exert a force to each of the electrodes 502.

Meanwhile, the workpiece 501 is rotated by a driving member 503. In one embodiment, the driving member 503 may be a motor and is connected to a rotating shaft 504 in the region C, as shown in FIGS. 11, 12 and 16. The rotating shaft 504 is rotated by the driving member 503 and spans the regions A, B and C, so that the driving member 503 rotates the workpiece 501 by the rotating shaft 504 in the region A. Therefore, the electrochemical machining device of the present disclosure can perform electrochemical machining with a huge area and multiple positions.

In the present disclosure, a plurality of electrodes 502 are disposed around the workpiece 501 for performing multi-dimensional machining. Moreover, the electrochemical machining device further includes a power supply system for properly performing machining on the electrodes 502. In FIG. 10, the electrodes 502 are separated into the upper side electrode group and the lower side electrode group. A length of the electrodes 502 of the lower side electrode group is greater than a length of the electrodes 502 of the upper side electrode group. The electrodes 502 of the lower side electrode group are disposed in the regions A and B. The electrodes 502 of the upper side electrode group are disposed in the region A. In the regions A and B, there is a power supply system which has a power supply path and is corresponding to the workpiece 501 and electrodes 502. In one embodiment, the rotating shaft 504 is rotatably connected to the power supply system and is electrically connected to the power supply system via the power supply path. The connection between the rotating shaft 504 and the power supply system may be a rubbing contact or a manner of retracting and releasing a wire.

Figure 17:
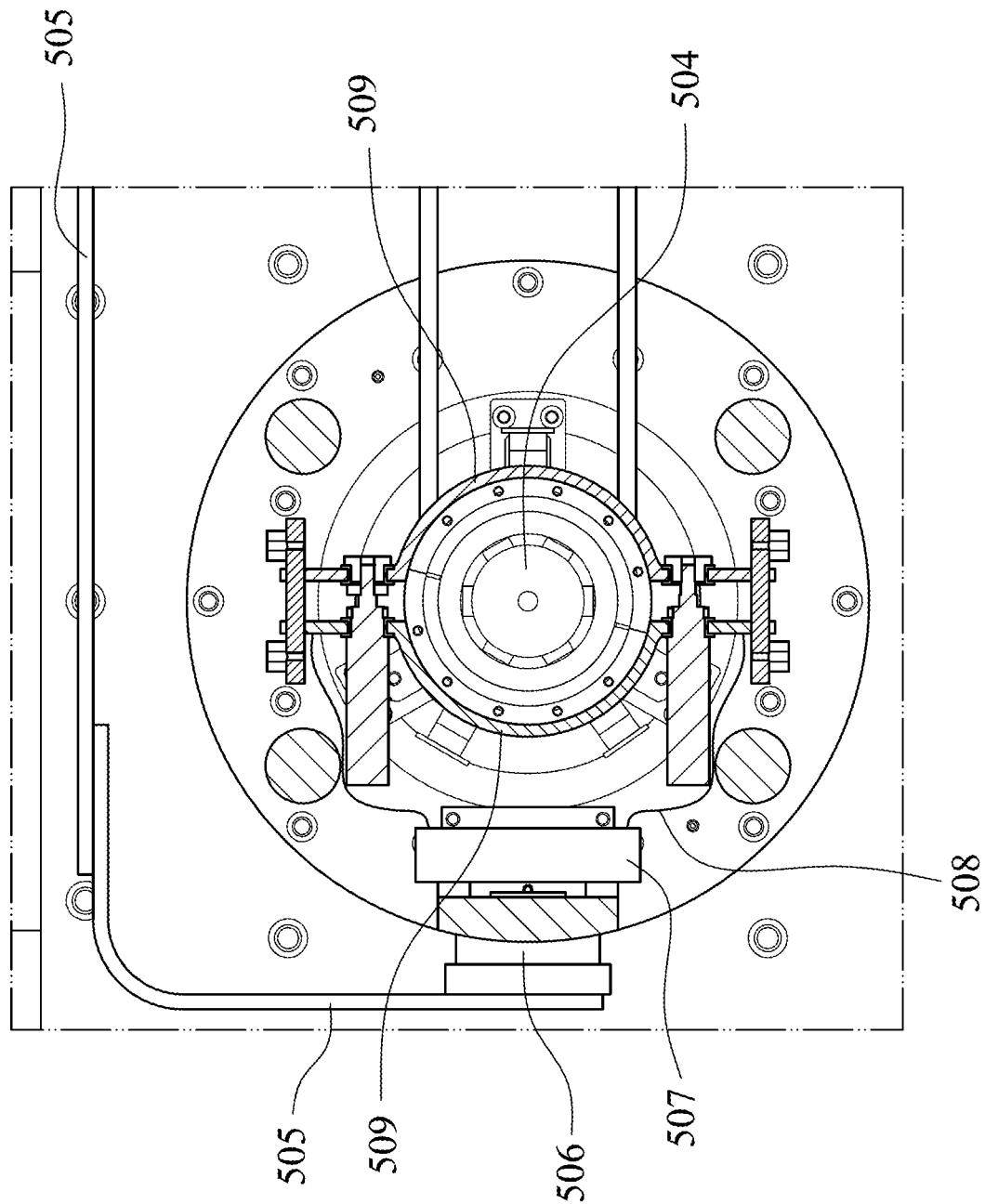
FIG. 17 is a cross-sectional view of a power supply path of the electrochemical machining device of FIG. 11.
Figure 18:
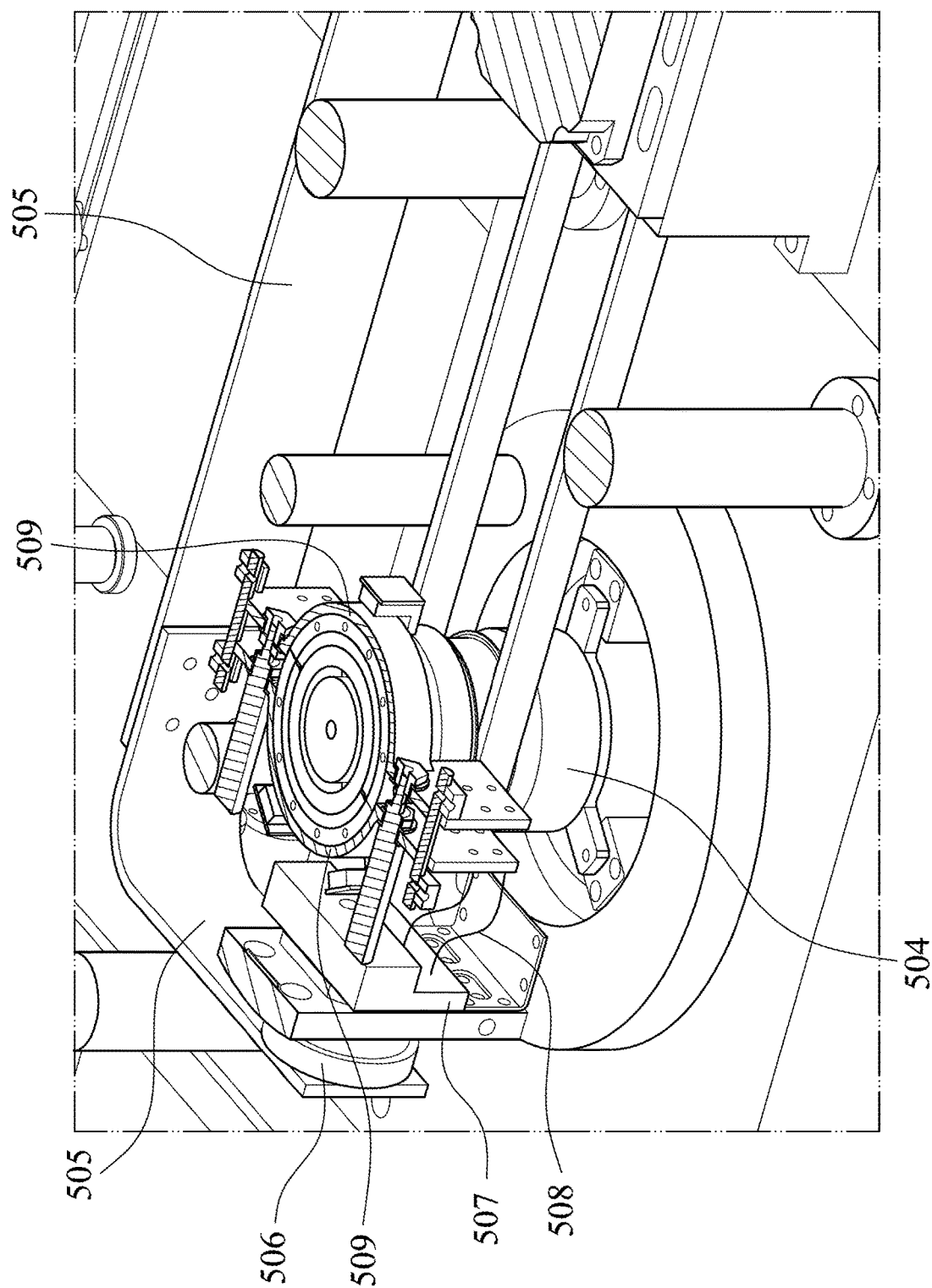
FIG. 18 is a schematic view showing the power supply path of the electrochemical machining device of FIG. 17.
Figure 19:
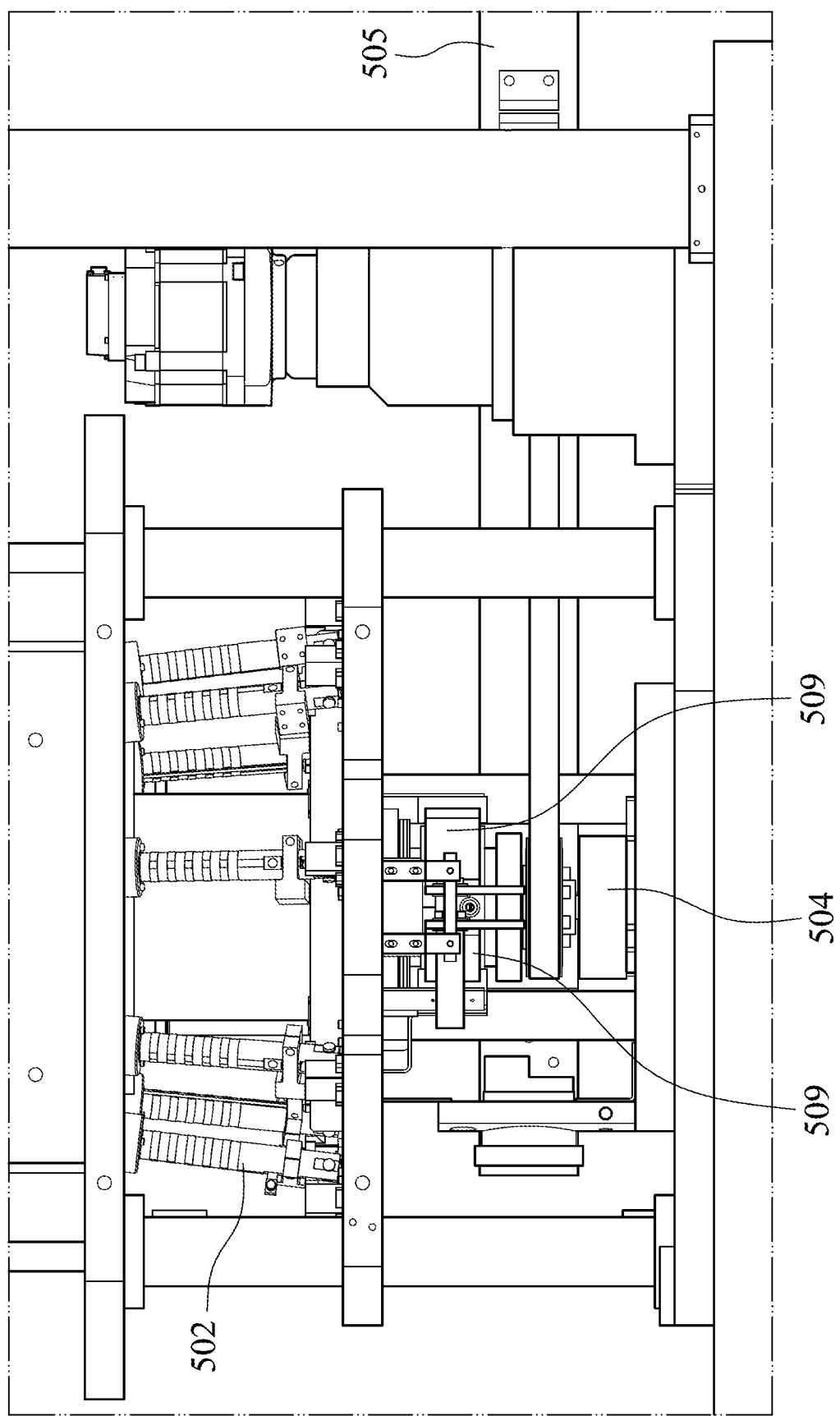
FIG. 19 is a schematic side view showing the power supply path of the electrochemical machining device of FIG. 17.

FIG. 17 is a cross-sectional view of a power supply path of the electrochemical machining device of FIG. 11; FIG. 18 is a schematic view showing the power supply path of the electrochemical machining device of FIG. 17; and FIG. 19 is a schematic side view showing the power supply path of the electrochemical machining device of FIG. 17. In FIGS. 10 and 17-19, the connection between the rotating shaft 504 and the power supply system is the rubbing contact. The power supply system provides a negative charge to each of the electrodes 502 as a cathode via any possible type (e.g., a cable for providing the negative charge). The power supply system provides a positive charge to the workpiece 501 as an anode along a power supply path. The cathode and the anode are utilized to perform electrochemical machining. The power supply system includes two conductive plates 505, a first conductive member 506, a second conductive member 507, a conductive belt 508, two conductive half-loop rings 509. An electric power is introduced through the two conductive plates 505. The number of the conductive plates 505 depends on actual requirements. The conductive plates 505 can be sequentially connected to each other. The first conductive member 506 is disposed between one of the conductive plates 505 and the second conductive member 507. The electric power is sequentially passed through the two conductive plates 505, the first conductive member 506 and the second conductive member 507. Because some components of the electrochemical machining device may be made of a conductive material (e.g., a metal material), the components must be insulated to prevent an electrical connection caused by a short circuit condition from non-normal operating conditions. Therefore, after the electric power is passed through the first conductive member 506 and the second conductive member 507, the electric power is passed through the conductive belt 508 and the two conductive half-loop rings 509. The two conductive half-loop rings 509 are corresponding to each other and disposed around the rotating shaft 504. The conductive belt 508 is connected to one of the two conductive half-loop rings 509. The two conductive half-loop rings 509 are electrically connected or disconnected to the workpiece 501 according to the feeding of the electrodes 502. In detail, the two conductive half-loop rings 509 are not connected to each other first. Second, when the electrodes 502 is pressed by a pressing plate 520 to gradually move to the workpiece 501, the two conductive half-loop rings 509 are gradually moved toward the rotating shaft 504 located between the two conductive half-loop rings 509 at the same time. Third, when the electrodes 502 are moved to a proper position, the two conductive half-loop rings 509 are connected to each other and electrically connected to the rotating shaft 504. Due to the conductive belt 508 being connected to one of the two conductive half-loop rings 509 initially, the electric power is passed through the other of the two conductive half-loop rings 509 via the conductive belt 508 when the two conductive half-loop rings 509 are connected to each other. The electric power is transmitted to the workpiece 501 by the two conductive half-loop rings 509 and the rotating shaft 504. The workpiece 501 is rotated by the rotating shaft 504 and is performed electrochemical machining by electrically connecting to the two conductive half-loop rings 509. Accordingly, the electrochemical machining device of the present disclosure utilizes the feeding of the electrodes 502 as the cathode and the rotation of the workpiece 501 as the anode to perform electrochemical machining. The power supply system provides the positive charge to the workpiece 501 as the anode along the power supply path. The power supply path is formed by the two conductive plates 505, the first conductive member 506, the second conductive member 507, the conductive belt 508, the two conductive half-loop rings 509. The two conductive half-loop rings 509 are connected to the rotating shaft 504 by the rubbing contact, and then the two conductive half-loop rings 509 are electrically connected to the workpiece 501 via the rotating shaft 504. Hence, the components of the electrochemical machining device of the present disclosure can be insulated to prevent an electrical connection caused by a short circuit condition from non-normal operating conditions. In addition, the flexibility of structural arrangement can be increased.

According to the aforementioned embodiments and examples, the advantages of the present disclosure are described as follows.

1. The electrochemical machining device of the present disclosure uses the conductive ends which can have various angles respectively and can perform machining simultaneously, thus multiple points and multiple angles machining can be performed to form the complicated surface, and the machining efficiency can be improved.

2. The components of the electrochemical machining device of the present disclosure can be insulated to prevent an electrical connection caused by a short circuit condition from non-normal operating conditions. In addition, the flexibility of structural arrangement can be increased, thus greatly reducing manufacturing costs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrochemical machining device being capable of performing multi-dimensional machining, the electrochemical machining device comprising:
    a plurality of electrodes disposed around a workpiece;
    a guiding member configured to limit and guide each of the electrodes to move;
    a plate member configured to exert a force to each of the electrodes; and
    a driving member configured to rotate the workpiece;
    wherein the plate member is connected to each of the electrodes, a force-exerting direction of the force from the plate member to each of the electrodes is parallel to a central axis of each of the electrodes or deflects off the central axis, each of the electrodes is passed through the guiding member and configured to perform a machining on the workpiece which is rotated by the driving member, and each of the electrodes has an electrochemical machining direction which is oblique to the workpiece;
    wherein each of the electrodes is rigid and has a free end and a conductive end, the plate member is a plane plate, a surface of the free end has an arc shape, and the plate member exerts the force on the surface of the free end;
    wherein an electrolyte is configured to perform electrochemical machining and is supplied between the workpiece and the electrode;
    wherein the plate member comprises a surrounding sidewall, and the force is exerted to the free end of each of the electrodes by an inner surface or an outer surface of the surrounding sidewall.

2. The electrochemical machining device of claim 1, further comprising:
    a pressurized tank accommodating the guiding member, wherein the pressurized tank is configured to provide a flow pressure to the electrolyte which flows inside the pressurized tank.

3. The electrochemical machining device of claim 1, wherein the guiding member comprises a plurality of guiding apertures, and the electrodes are inserted through the guiding apertures, respectively.

4. The electrochemical machining device of claim 1, wherein the guiding member comprises a fixing member, and the fixing member is configured to limit a position of each of the electrodes.

5. The electrochemical machining device of claim 1, wherein each of the electrodes has a spring member disposed therethrough, and the spring member is configured to provide an elastic recovering force to each of the electrodes.

6. An electrochemical machining device being capable of performing multi-dimensional machining, the electrochemical machining device comprising:
    a plurality of electrodes disposed around a workpiece;
    a guiding member configured to limit and guide each of the electrodes to move;
    a plate member configured to exert a force to each of the electrodes;
    a driving member configured to rotate the workpiece; and
    a power supply system;
    wherein the plate member is connected to each of the electrodes, a force-exerting direction of the force from the plate member to each of the electrodes is parallel to a central axis of each of the electrodes or deflects off the central axis, the power supply system provides a negative charge to each of the electrodes and a positive charge to the workpiece along a power supply path, each of the electrodes is passed through the guiding member and configured to perform a machining on the workpiece which is rotated by the driving member, and each of the electrodes has an electrochemical machining direction which is oblique to the workpiece;
    wherein each of the electrodes is rigid and has a free end and a conductive end, the plate member is a plane plate, a surface of the free end has an arc shape, and the plate member exerts the force on the surface of the free end;
    wherein an electrolyte is configured to perform electrochemical machining and is supplied between the workpiece and the electrode;
    wherein the plate member comprises a surrounding sidewall, and the force is exerted to the free end of each of the electrodes by an inner surface or an outer surface of the surrounding sidewall.

7. The electrochemical machining device of claim 6, wherein the guiding member comprises a plurality of guiding apertures, and the electrodes are inserted through the guiding apertures, respectively.

8. The electrochemical machining device of claim 6, wherein the driving member is a motor.

9. The electrochemical machining device of claim 6, wherein the driving member rotates the workpiece by a rotating shaft.

10. The electrochemical machining device of claim 9, wherein the rotating shaft is rotatably connected to the power supply system and is electrically connected to the power supply system via the power supply path.

11. The electrochemical machining device of claim 1, wherein the electrodes have a plurality of slots, and the electrolyte flows through the slots in the electrodes.

12. The electrochemical machining device of claim 6, wherein the electrodes have a plurality of slots, and the electrolyte flows through the slots in the electrodes.

* * * * *